(12) United States Patent
Seeds et al.

(10) Patent No.: US 11,898,587 B2
(45) Date of Patent: Feb. 13, 2024

(54) TORQUE-LIMITING NUT

(71) Applicant: Stemco Products, Inc., Charlotte, NC (US)

(72) Inventors: Larry Seeds, Charlotte, NC (US); Mark Gold, Charlotte, NC (US); Herman Goins, Jr., Charlotte, NC (US)

(73) Assignee: Stemco Products, Inc., Charlotte, NC (US)

(*) Notice: Subject to any disclaimer, the term of this patent is extended or adjusted under 35 U.S.C. 154(b) by 492 days.

(21) Appl. No.: 17/069,635

(22) Filed: Oct. 13, 2020

(65) Prior Publication Data
US 2021/0108666 A1 Apr. 15, 2021

Related U.S. Application Data

(60) Provisional application No. 62/915,122, filed on Oct. 15, 2019.

(51) Int. Cl.
*F16B 31/02* (2006.01)
(52) U.S. Cl.
CPC .................................. *F16B 31/024* (2013.01)
(58) Field of Classification Search
CPC ...... F16B 31/027; F16B 31/028; F16B 39/10; F16B 31/02; F16B 23/0076; F16B 31/024; H05K 7/1053; Y10S 411/911
USPC ....................... 411/911, 197, 204, 6, 7, 8–12
See application file for complete search history.

(56) References Cited

U.S. PATENT DOCUMENTS

| | | | |
|---|---|---|---|
| 2,373,812 A | 4/1945 | Coop | |
| 2,393,764 A | 1/1946 | Frank | |
| 3,504,591 A | 4/1970 | Christophersen | |
| 3,670,795 A * | 6/1972 | Kupfrian | H05K 7/1412 411/191 |
| 4,407,529 A * | 10/1983 | Holman | H01R 13/622 439/321 |

(Continued)

FOREIGN PATENT DOCUMENTS

EP 1131214 B1 4/2003

OTHER PUBLICATIONS

PCT/US20/55415 International Search Report and Written Opinion dated Jan. 8, 2021, 7 pgs. total.

(Continued)

*Primary Examiner* — Victor D Batson
*Assistant Examiner* — Dil K. Magar
(74) *Attorney, Agent, or Firm* — Perkins Coie LLP (57) ABSTRACT

A torque-limiting nut is provided. The torque-limiting nut has a washer, a threaded component, and a tool interface. The threaded component has a plurality of detents and the tool interface has a corresponding plurality of recesses and a spring groove. A plurality of engagement members are sized and shaped to fit within the plurality of detents and recesses. An elastic member in the spring grooves provides a compressive force to seat the pins in the corresponding detents to frictionally couple the threaded component and tool interface. When a torque required to rotate the tool interface exceeds a predetermined value, the pin moves against the spring and unseats from the detent such that the tool interface rotates without rotating the threaded component.

17 Claims, 6 Drawing Sheets

(56) References Cited

U.S. PATENT DOCUMENTS

| | | | | |
|---|---|---|---|---|
| 4,512,697 | A * | 4/1985 | Cascini | F16B 31/02 411/7 |
| 5,020,949 | A * | 6/1991 | Davidson | F16B 31/02 411/3 |
| 5,069,587 | A | 12/1991 | Levenstein | |
| 5,154,557 | A | 10/1992 | Houck | |
| 5,180,265 | A | 1/1993 | Wiese | |
| 5,779,409 | A * | 7/1998 | Manzolli | F16B 31/02 411/105 |
| 5,927,917 | A | 7/1999 | Gibbons | |
| 6,095,735 | A * | 8/2000 | Weinstein | F16B 39/10 411/209 |
| 6,135,687 | A * | 10/2000 | Leek | F16B 31/028 411/10 |
| 6,981,882 | B1 * | 1/2006 | Palaniappa | H05K 7/1053 439/73 |
| 7,270,509 | B2 * | 9/2007 | Disantis | F16B 39/282 411/332 |
| 8,403,611 | B2 * | 3/2013 | Friesen | F16B 39/32 411/533 |
| 8,747,039 | B2 * | 6/2014 | Yasui | F16B 39/02 411/6 |
| 8,748,039 | B2 * | 6/2014 | Ogino | H01G 11/12 29/25.03 |
| 8,870,149 | B2 * | 10/2014 | Rodig | B64D 47/00 403/322.2 |
| 8,881,478 | B2 * | 11/2014 | Gray | E04B 1/26 52/223.14 |
| 10,876,569 | B2 * | 12/2020 | Archer | F16B 39/34 |
| 2002/0076296 | A1 * | 6/2002 | Dunfee | F16B 31/028 411/8 |
| 2006/0029485 | A1 * | 2/2006 | Weinstein | F16B 39/10 411/121 |
| 2011/0027041 | A1 | 2/2011 | Friesen et al. | |
| 2012/0237312 | A1 * | 9/2012 | Widule | F16B 31/027 411/6 |
| 2014/0159361 | A1 * | 6/2014 | Weir | E21B 17/085 166/380 |
| 2016/0097474 | A1 * | 4/2016 | Settu | F16L 25/0018 285/390 |
| 2016/0193969 | A1 * | 7/2016 | Johansson | B25B 13/481 81/477 |
| 2017/0058652 | A1 * | 3/2017 | Boyd | F04B 53/12 |
| 2018/0356015 | A1 * | 12/2018 | Jahnke | B25B 13/5091 |

OTHER PUBLICATIONS

EEP20876689.9 Extended European Search Report dated Oct. 27, 2023, 5 pgs. total.

* cited by examiner

TORQUE-LIMITING NUT

CROSS-REFERENCE TO RELATED PATENT APPLICATIONS

The present application claims priority to U.S. Provisional Patent Application Ser. No. 62/915,122, filed Oct. 15, 2019, titled TORQUE-LIMITING NUT, the disclosure of which is incorporated by reference as if set out in full.

BACKGROUND

Nut assemblies are well known implements that are generally used to hold an object in place. Nut assemblies may be used in numerous applications. In one application, a nut assembly may be used to hold a wheelend assembly on a spindle or vehicle axle.

Conventionally, nut assemblies comprise a nut and a washer that are operably coupled. The nut of the nut assembly is typically a metal or composite part with a threaded bore. The threads operatively engage corresponding threads on the spindle, for example. The nut assembly is screwed onto the spindle and tightened against the object (wheelend) to be held in place.

While simple in concept, tightening the nut assembly to hold a wheelend assembly on the spindle is complex. The nut assembly requires tightening to a particular torque to provide sufficient seating force to hold the nut assembly in place and preload the bearings, but excessive torque may, in certain implementations, cause damage to the part(s) or make removal difficult. Many nut assemblies, including spindle nut assemblies, require the use of complex procedures and a torque wrench to properly seat the nut assembly against the object (wheelend).

Unfortunately, installers frequently lack the proper equipment or expertise for seating the nut assembly on a spindle. The preloading on the bearings when a torque wrench, for example, is not available often provides preloading that is high or low. The bearings for wheelends experience increased wear and reduced lifespans when not properly preloaded.

Thus, against this background, a torque-limiting spindle nut is desirous. Such a spindle nut should allow for applying the correct torque to seat a nut assembly on the spindle without the use of a torque wrench or other procedures.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a torque-limiting spindle nut is provided. The torque-limiting spindle nut may include a threaded component that is releasably, rotatably coupled to a tool interface. The threaded component includes a cylindrical main body having an internally threaded bore. A first end of the cylindrical main body comprises a flanged portion having an outer diameter. The cylindrical main body has a plurality of detents. The tool interface has an internal bore sized to receive the cylindrical main body. The internal bore has a plurality of recesses corresponding to the plurality of detents. The internal bore comprises an annular spring groove in communication with the plurality of recesses. A plurality of engagement members, such as pins, fit in the detents and recesses. An elastic member in the spring groove is in contact with the plurality of engagement members and provides a compressive force tending to move the engagement members into the detents frictionally coupling the tool interface to the threaded component.

In some embodiments, the elastic member is a spring, preferably a garter spring, where the compressive force provided by the elastic member is overcome at a predetermined torque such that the pin moves from the detent into the recess against the elastic member when the torque is equal to the torque limit.

In some embodiments, the recess has a pin seat, a radially extending first wall extending from the pin seat to the internal bore and a second wall at an angle to the radially extending wall where the second wall engages the pin to cause the pin to engage the detent when a rotational force is applied to the tool interface tending to loosen the torque limiting spindle nut.

The torque-limiting spindle nut also comprises a washer coupled to the threaded component. In certain embodiments, the washer is coupled to the flanged portion of the threaded component by a retainer device. The washer, in certain aspects, has an outer diameter sidewall and a base surface that are sized to receive the flanged portion. The retainer device, in certain aspects, includes a groove in the outer diameter of the flanged portion and an aligned groove in the inner surface of the outer diameter sidewall. A retainer ring fits in both the groove and the aligned groove to couple the washer and the threaded component.

In certain aspects, the torque-limiting spindle nut includes a unitization ring coupled to an upper portion of the threaded component. In certain embodiments, the upper edge of the cylindrical main body is crimped or rolled to form the unitization ring to couple the tool interface and the threaded components.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a spindle nut for a vehicle. However, the technology described herein may be used with applications other than those specifically described herein. For example, the technology of the present application may be applicable to fastening compressible materials such as wood or plastic, lifting a limited amount of weight using a screw/nut, or coupling pipe flanges to a specified torque, or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1A:
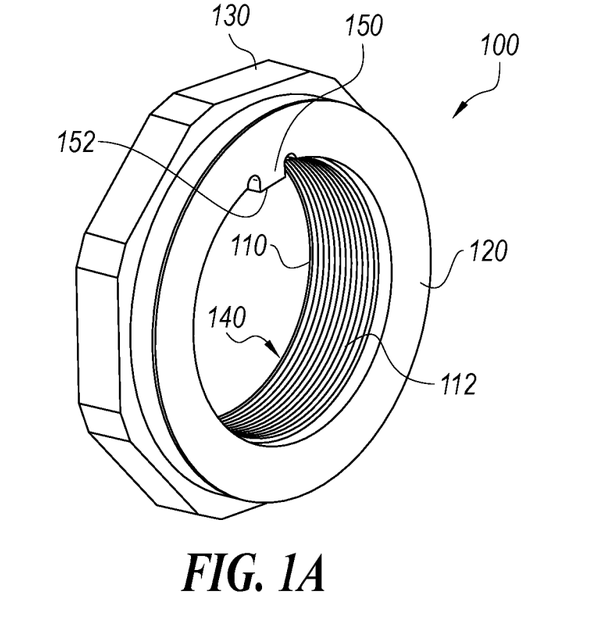
FIG. 1*a* is a perspective view of a torque-limiting nut consistent with the technology of the present application.
Figure 1B:
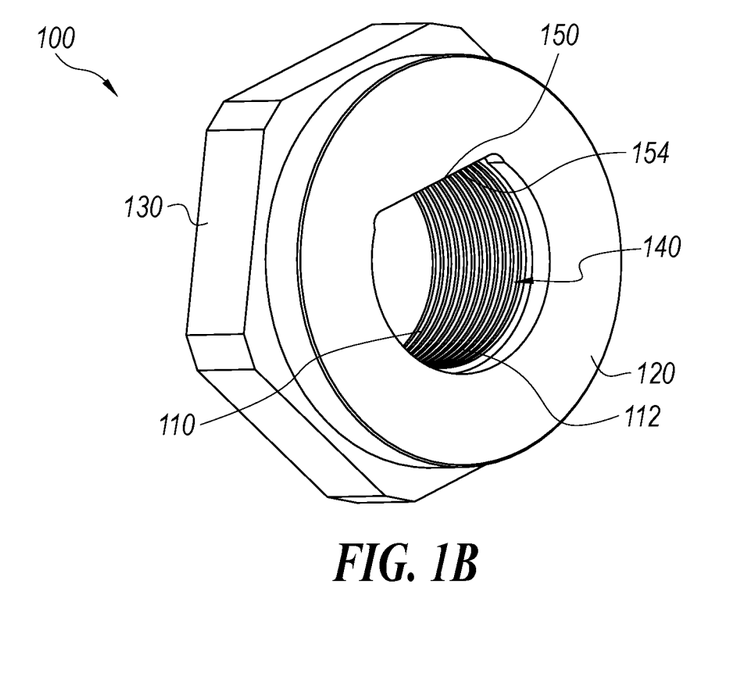
FIG. 1*b* is a perspective view of a torque-limiting nut consistent with the technology of the present application.

With reference now to FIGS. 1a and 1b, views of a torque-limiting nut assembly 100 consistent with the technology of the present application is provided. In this exemplary embodiment, the torque-limiting nut is a torque-limiting spindle nut 100 as it is designed to engage a spindle to seat a wheelend assembly. Generally, however, the terms torque-limiting nut and torque-limiting spindle nut are used interchangeably. The torque-limiting spindle nut 100 comprises a threaded component 110, a washer 120, and a tool interface 130. The torque-limiting spindle nut 100 has a bore 140 and the threaded component 110 has internal threads 112 along the bore 140. The internal threads 112 are shaped to engage corresponding threads on the spindle in this particular example. However, the torque-limiting spindle nut assembly 100 may be configured for other applications. The washer 120 of the torque-limiting spindle nut 100 includes an anti-rotation device 150. The anti-rotation device 150 may be a tang 152, as shown in FIG. 1a, or a flat 154, as shown in FIG. 1b. The anti-rotation device 150 is shaped to engage a similar anti-rotation feature on the device to which the threaded component 110 is threaded, such as, for example, a spindle. Other key/keyway type of arrangements are possible, and the tang 152 and flat 154 are but two examples.

Figure 2:
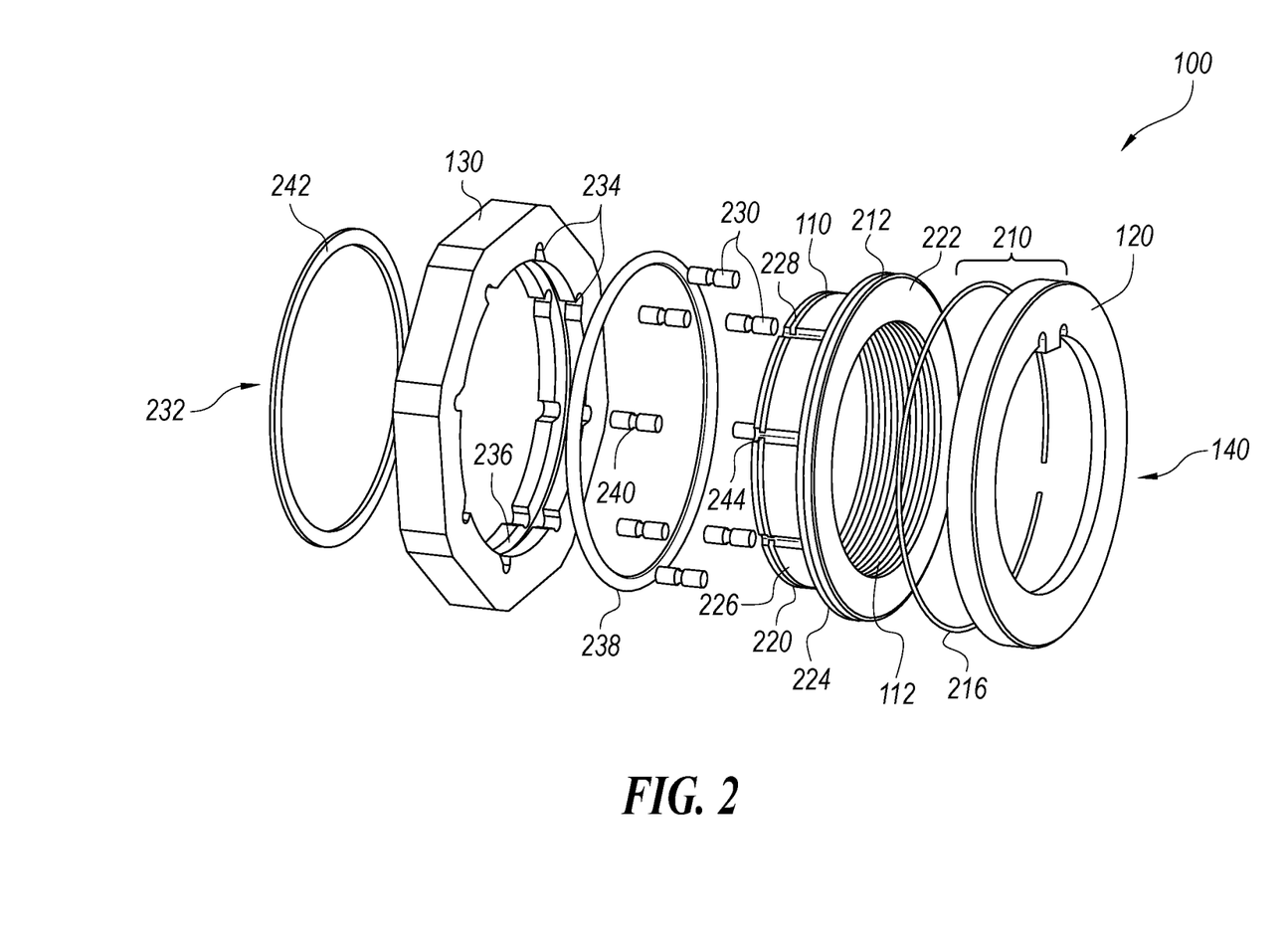
FIG. 2 is an exploded perspective view of the torque-limiting nut of FIG. 1*a*.

FIG. 2 shows an exploded view of the torque-limiting spindle nut 100. The torque-limiting spindle nut 100 includes the threaded component 110, the washer 120, and the tool interface 130, which is presently shown as an octal tool interface, although any tool interface is possible. As will be explained further below, the washer 120 and the threaded component 110 are unitized by a retaining device 210, which includes a groove 212 on the outer diameter of the threaded component 110, an aligned groove on an inner surface of the washer 120 (shown below in FIG. 4), and a retaining ring 216 configured to fit in both the groove 212 and the aligned groove (shown in FIG. 4 below) to unitize the threaded component 110 and washer.

Figure 8:
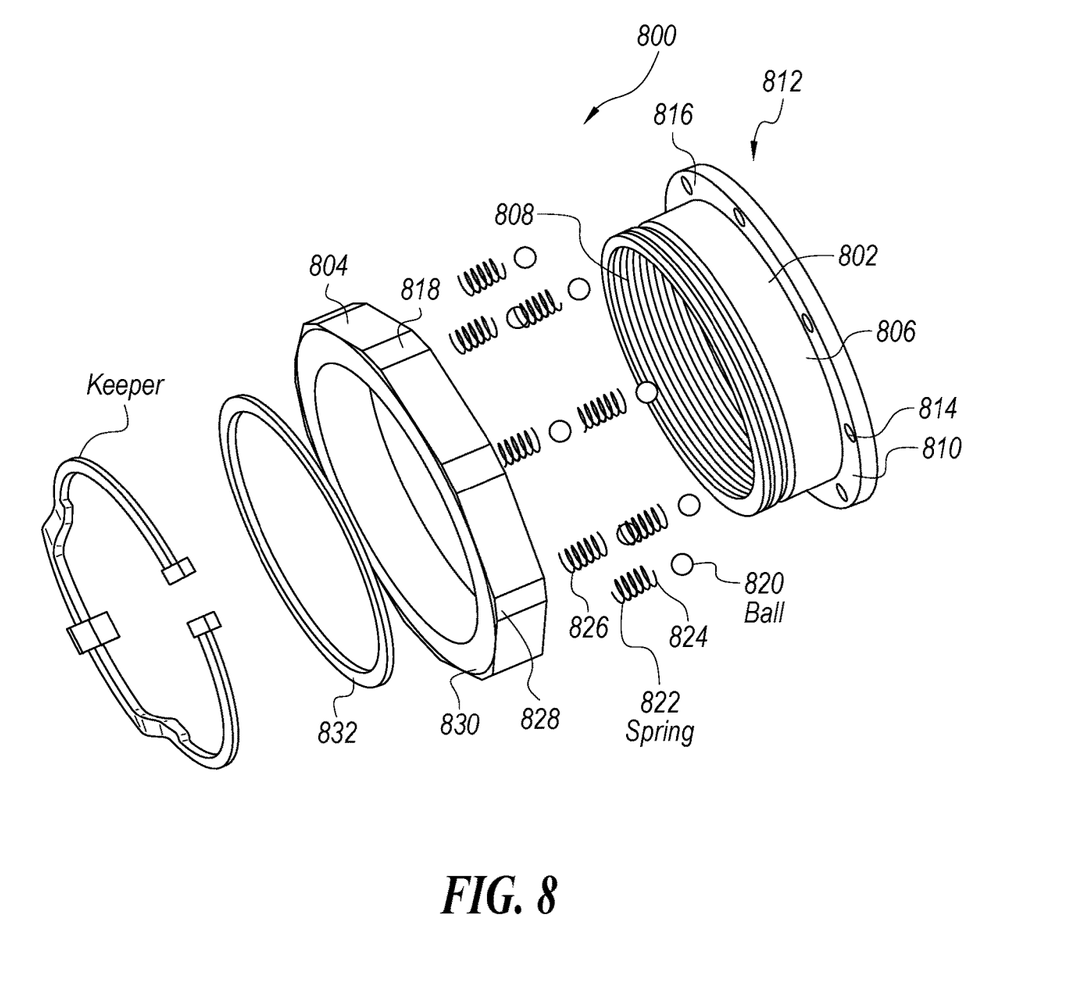
FIG. 8 is an exploded, perspective view of another torque-limiting nut consistent with the technology of the present application.

The threaded component 110 has a cylindrical main body 220 that has a bore 140 with internal threads 112. The cylindrical main body has a washer side 222 that terminates in a flanged portion 224. The groove 212 is formed on the outer diameter of the flanged portion 224 of the threaded component 110. The cylindrical main body has an outer sidewall 226 with a plurality of axially extending detents 228 in the outer sidewall 226. The axially extending detents 228 are sized to fit a corresponding plurality of engagement members 230, which are pins 230 in this exemplary embodiment. The pins 230 are shown as elongated cylindrical members, but could be balls, such as is shown in FIG. 8, or other shapes. The description herein relates to the embodiment where the engagement members 230 are pins 230 as shown.

The tool interface 130 has an internal bore 232 shaped to cooperatively engage the cylindrical main body 220 of the threaded component 110. The internal bore 232 has a plurality of axially extending recesses 234 that align, generally, with the plurality of axially extending detents 228. The terms detent and recess may alternatively be termed first detent and second detent, first recess and second recess, etc. Also, terms like groove, channel, etc. may be used to describe the feature. The plurality of pins 230 engage both the detents 228 and the recesses 234, as will be explained further below. The internal bore 232 also has a seating groove 236. The seating groove 236 is shown approximately halfway along the internal bore 232, but could be arranged anywhere along the internal bore 232. The seating groove 236 is open to the recesses 234. An elastic member 238, such as a garter spring, is arranged in the seating groove 236, which may be referred to as a spring groove 236 as it receives a spring in certain embodiments. The elastic member 238 provides a compressive force tending to seat the pins 230 into the detents 228. The pins 230, in certain embodiments, may or may not have a seating groove 240 sized to engage the elastic member 238. A unitization ring 242 engages a unitization channel 244 in the outer sidewall 226 of the cylindrical main body 220. The unitization ring 242 inhibits the tool interface 130 from being removed from the threaded component 110. In certain embodiments, the threaded component 110 may have a crimped or rolled lip at a top edge of the cylindrical main body 220 rather than the unitization ring 242.

Figure 3:
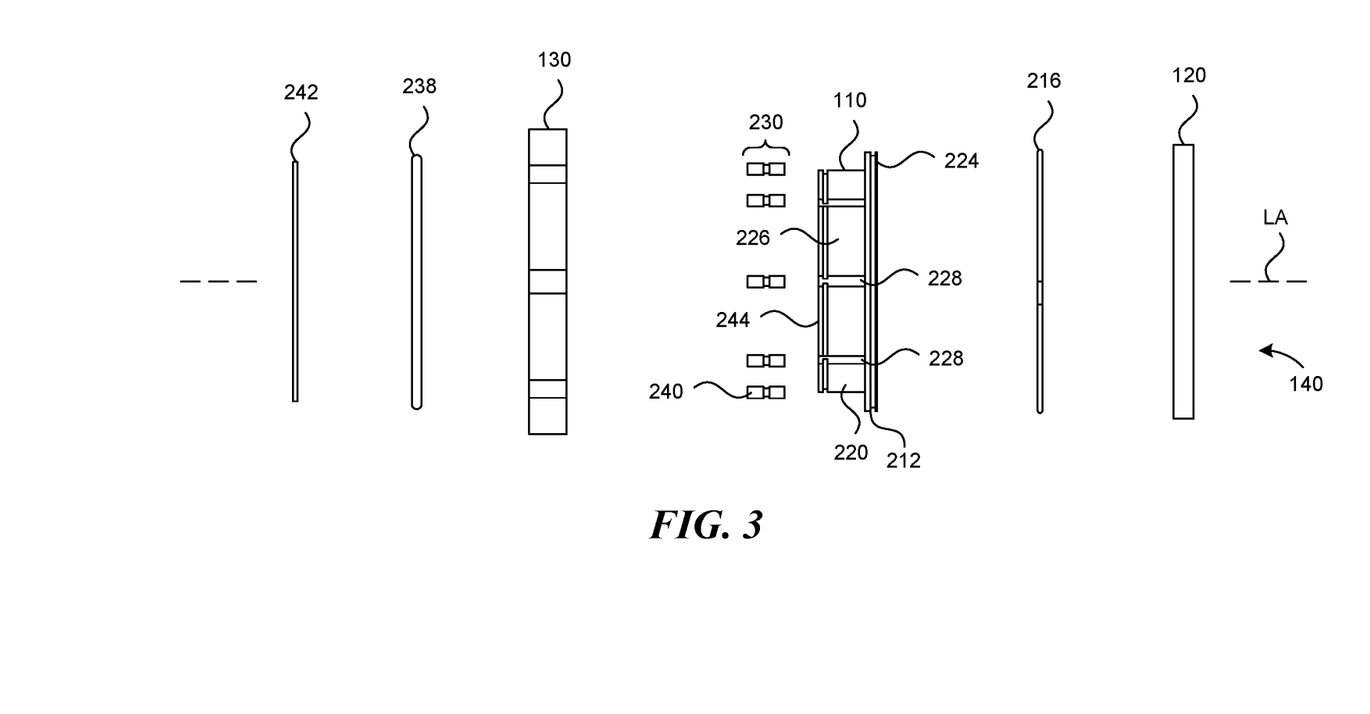
FIG. 3 is another exploded view of the torque-limiting nut of FIG. 1*a*.

FIG. 3 shows another exploded view of the torque-limiting spindle nut 100. FIG. 3 shows the threaded component 110, the washer 120, the tool interface 130, the retaining ring 216, the cylindrical main body 220 having a flanged portion 224 with a groove 212 in the outer diameter and a unitization channel 244, the outer sidewall 226 with the plurality of axially extending detents 228, the plurality of pins 230, the elastic member 238, and the unitization ring 242.

Figure 4:
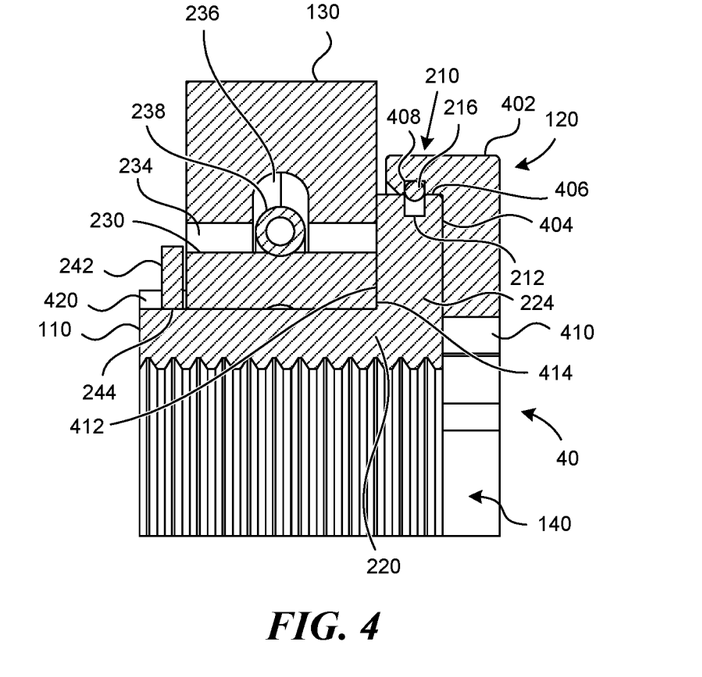
FIG. 4 is a cross-sectional view of a portion of the torque-limiting nut of FIG. 1*a*.

FIG. 4 shows a cross-sectional view of the torque-limiting spindle nut 100. As can be seen best in FIG. 4, the washer 120 has an outer diameter sidewall 402 and base surface 404 extending radially inwardly. The outer diameter sidewall 402 has an inner surface 406 with an aligned groove 408. The aligned groove 408 is aligned with the groove 212 on the outer diameter of the threaded component 110. The retaining ring 216 fits in both the groove 212 and the aligned groove 408 and is the retaining device 210 that unitizes the washer 120 and the threaded component 110. The base surface 404 has a base surface bore 410 with a diameter equal to or greater than the diameter of the bore 140 of the threaded component 110. The outer diameter sidewall 402 and base surface 404 are sized and shaped to receive the flanged portion 224 of the threaded component 110.

The tool interface 130 has a bottom surface 412 that engages a top surface 414 of the flanged portion 224. The tool interface 130 spring groove 236 is shown with the elastic member 238, which is shown in this example as garter spring 238. The elastic member 238 provides a compressive force against the pin 230 tending to seat the pins 230 into the axially extending detents 228 of the threaded component 110.

FIG. 4 also shows the unitization ring 242 in the unitization channel 244. As mentioned above, the unitization ring 242 may be replaced by crimping or rolling a top edge 420 of the cylindrical main body 220 after the tool interface 130 is fitted onto the threaded component 110.

Figure 5:
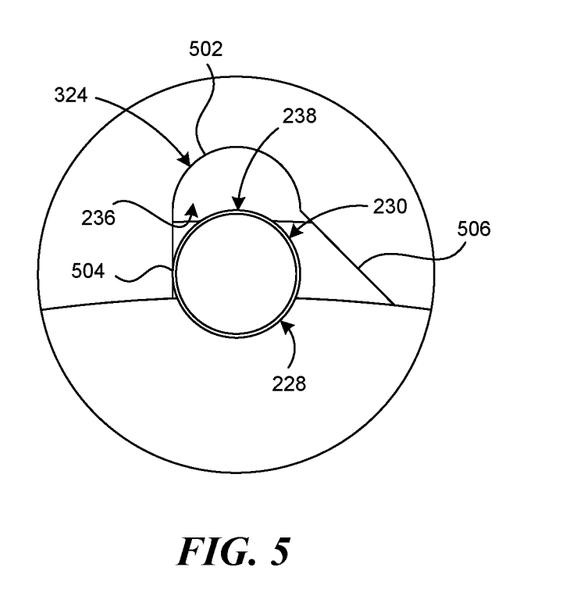
FIG. 5 is a view the connection between a threaded component and a tool interface of the torque-limiting nut of FIG. 1*a*.

FIG. 5 shows a detail of the engagement between the tool interface 130 and the threaded component 110. FIG. 5 shows a single detent 228 and recess 234 with a pin 230. The elastic member 238 in the spring groove 236 is shown providing a compressive force on the pin 230 tending to seat the pin 230 in the detent 228. The recess 234 is open to the spring groove 236. The recess 234 has a pin seat 502 and a radially extending recess wall 504, which extends substantially 90° from the tangent of the internal bore, extending from the pin seat 502 to the internal bore 232 (see FIG. 2). The recess 234 has a second recess wall 506 angled with respect to the radially extending recess wall 504. The angle formed with the radially extending recess wall 504 may be about 25 to 50° in certain embodiments and between about 10 to 85° in other embodiments. Preferably, the angle between 30 and 60° and is about 45° in the present example.

Figure 6:
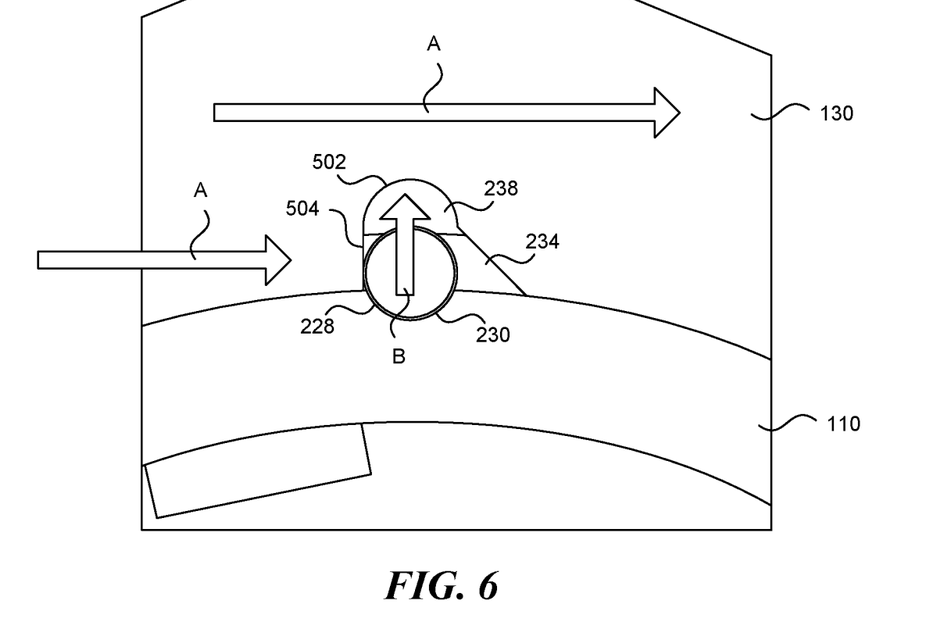
FIGS. 6 and 7 are cross-sectional views of FIG. 5 with force components regarding tightening and loosening the torque-limiting nut of FIG. 1*a*.

Tightening the torque-limiting spindle nut on a spindle is explained with reference to FIG. 6. FIG. 6 shows a cross-sectional view of the threaded component 110 and tool interface 130 at a single pin 230. The pin 230 is set in detent 228 of the threaded component 110 and the recess 234 of the tool interface 130. The elastic member 238 provides a compressive force tending to seat the pin 230 in the detent 228. A force is applied to the tool interface 130 rotating the tool interface 130 in the direction shown by arrow A. The radially extending recess wall 504 contacts the pin 230 and the elastic member 238, compresses the pin 230 into the detent 228 causing a frictional fit between the tool interface 130 and the threaded component 110. As the tool interface 130 rotates, the frictional force needed as the nut tightens on the spindle increases. The force, as shown by arrow B, acts against the compressive force of the elastic member 238. At a predetermined force (the torque limit), the rotational force unseating the pin 230 overcomes the compressive force of the elastic member 238 and the pin 230 move out of the detent 228 and at least partially into the pin seat 502 or recess. Once the pin 230 moves from the detent 228, the tool interface 130 is not frictionally engaged with the threaded component 110 such that additional rotation of the tool interface 130 does not cause additional tightening of the threaded component 110 on the spindle.

Figure 7:
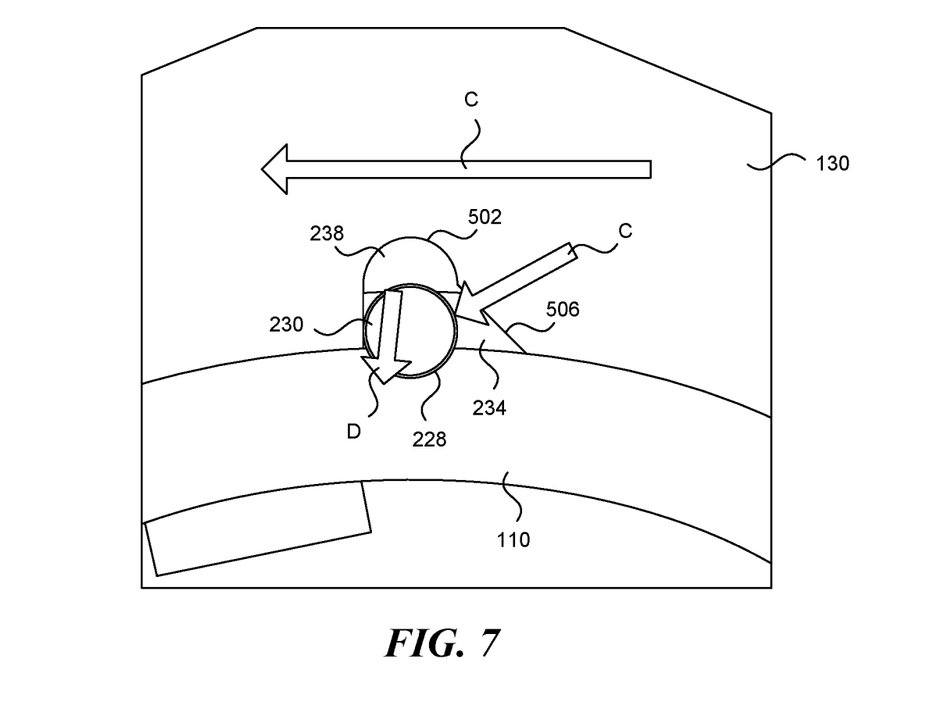

Loosening the torque-limiting spindle nut 100 from a spindle is explained with reference to FIG. 7. FIG. 7 shows a cross-sectional view of the threaded component 110 and tool interface 130 at a single pin 230. The pin is seated in the detent 228, but at the maximum torque. When loosening the nut 100, a rotational force is applied to the tool interface 130, as shown by arrow C. Initially, the rotation of the tool interface 130 is at the torque limit and the pin 230 would initially move against the elastic member 238 tending to disengage the pin 230 from the detent 228. However, the second recess wall 506 is angled such that as the tool interface 130 rotates in the direction shown by arrow C, the pin 230 contacts second recess wall 506 that pushes the pin 230, as shown by arrow D, into detent 228 causing a frictional engagement between the tool interface 130 and the threaded component 110. Thus, the torque-limiting spindle nut 100 may be disengaged from the spindle.

FIG. 8 shows an exploded, perspective view of a portion of another torque-limiting spindle nut 800. FIG. 8 shows the threaded component 802 and tool interface 804. The threaded component 802 has a cylindrical main body 806 with an internally threaded bore 808. The threaded component 802 has an annular and radially extending flanged portion 810 at a first end 812 of the cylindrical main body 806. The flanged portion 810 has a plurality of spaced detents 814 in a tool interface surface 816 of the flanged portion 810.

The tool interface 804 has a plurality of axially extending recesses 818 corresponding to the plurality of spaced detents 812. The recesses 816, in certain embodiments, are holes (which may be blind holes) in the tool interface 804. Also, in certain embodiments, the recesses 816 may be located on the inner surface of the bore in the tool interface 804. A plurality of engaging members 820, such as balls 820 shown, reside in the detents 814 and extend, at least in part, into the recesses 818, or holes 818. A plurality of compression members 822 are in the axially extending recesses 818, or holes 818, with a first end 824 contacting the engaging members 820 and a second end 826, opposite the first end 824, engaging a lip 828, or hole bottom 828, on a distal end 830 of the tool interface 804, and in certain embodiments, the second end 826 may engage the retaining ring 832. The compression members 822, which are shown as coiled springs, provide a compressive force tending to seat the engaging members 820 in the detents 814 forming a frictional engagement between the tool interface 804 and the threaded component 802. When the torque limit is reached, the engaging members 820 push against the compression members 822 and disengage from the detents 814 such that the frictional engagement between the tool interface 804 and threaded component 802 is broken at the torque limit.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A torque-limiting nut comprising,
a threaded component, the threaded component comprising:
  a cylindrical main body having a threaded bore, an outer surface, a plurality of detents in the outer surface; and
  an annular flanged portion radially extending from an end of the cylindrical main body,
a tool interface, separate from the threaded component, having an internal bore sized to receive the cylindrical main body of the threaded component, the tool interface comprising:
  a plurality of recesses formed in the internal bore corresponding to the plurality of detents, each of the plurality of recesses comprising a seating groove;
  a spring groove open to the recesses and the internal bore; and
  an elastic member in the spring groove,
  wherein each of the seating grooves receives the elastic member;
a plurality of engagement members wherein the plurality of engagement members are configured to reside, in part, in the plurality of detents and, in part, in the plurality of recesses, and
wherein, the elastic member provides a compressive force on the plurality of engagement members such that rotation of the tool interface causes the threaded component to rotate until a rotational torque applied to the tool interface exceeds a predefined torque-limit.

2. The torque-limiting nut of claim 1 wherein the each of the plurality of recesses formed in the internal bore comprise at least an engagement member seat, a radially extending recess wall, and a second recess wall.

3. The torque-limiting nut of claim 2 wherein the second recess wall is angled with respect to the radially extending recess wall.

4. The torque-limiting nut of claim 1 comprising a unitization ring and wherein the threaded component comprises a unitization channel sized to receive the unitization ring such that the unitization ring inhibits the tool interface from sliding off the cylindrical main body of the threaded component.

5. The torque-limiting nut of claim 1 wherein the elastic member comprises at least one of a spring washer, wave spring, or a die spring.

6. The torque-limiting nut of claim 1 wherein the plurality of engagement members are pins.

7. The torque-limiting nut of claim 1 wherein the plurality of engagement members are balls.

8. A torque-limiting nut comprising:
a threaded component, the threaded component comprising:
  a cylindrical main body having a threaded bore, an outer surface, a plurality of detents in the outer surface; and
  an annular flanged portion radially extending from an end of the cylindrical main body,
a tool interface, separate from the threaded component, having an internal bore sized to receive the cylindrical main body of the threaded component, the tool interface comprising:
  a plurality of recesses formed in the internal bore corresponding to the plurality of detents, wherein the each of the plurality of recesses formed in the internal bore comprise at least an engagement member seat, a radially extending recess wall, and a second recess wall, wherein the second recess wall is angled with respect to the radially extending recess wall, and wherein the angle between the second recess wall and the radially extending recess wall is between 20 and 70 degrees;
  a spring groove open to the recesses and the internal bore; and
  an elastic member in the spring groove;
a plurality of engagement members wherein the plurality of engagement members are configured to reside, in part, in the plurality of detents and, in part, in the plurality of recesses, and
wherein the elastic member provides a compressive force on the plurality of engagement members such that rotation of the tool interface causes the threaded component to rotate until a rotational torque applied to the tool interface exceeds a predefined torque-limit.

9. The torque-limiting nut of claim 8 wherein the angle is between 30 and 60 degrees.

10. The torque-limiting nut of claim 9 wherein the angle is about 45 degrees.

11. A torque-limiting nut comprising:
a threaded component, the threaded component comprising:
  a cylindrical main body having a threaded bore, an outer surface, a plurality of detents in the outer surface; and
  an annular flanged portion radially extending from an end of the cylindrical main body,
a washer wherein the washer is coupled to the threaded component by a retaining device. wherein the retaining device comprises a groove in an outer diameter of the flanged portion of the threaded component, an aligned groove in the washer, and a retaining ring in the groove and the aligned groove;
a tool interface, separate from the threaded component, having an internal bore sized to receive the cylindrical main body of the threaded component, the tool interface comprising:
  a plurality of recesses formed in the internal bore corresponding to the plurality of detents;
  a spring groove open to the recesses and the internal bore; and
  an elastic member in the spring groove;
a plurality of engagement members wherein the plurality of engagement members are configured to reside, in part, in the plurality of detents and, in part, in the plurality of recesses, and
where the elastic member provides a compressive force on the plurality of engagement members such that rotation of the tool interface causes the threaded component to rotate until a rotational torque applied to the tool interface exceeds a predefined torque-limit.

12. The torque-limiting nut of claim 11 wherein the washer comprises an anti-rotation device.

13. The torque-limiting nut of claim 12 where the anti-rotation device is at least one of a tang or a flat.

14. A torque-limiting nut comprising:
a threaded component, the threaded component comprising:
  a cylindrical main body having a threaded bore and an outer surface; and an annular flanged portion radially extending from an end of the cylindrical main body, the annular flanged portion having a tool interface surface comprising a plurality of spaced detents,
a tool interface, separate from the threaded component, having an internal bore sized to receive the cylindrical main body of the threaded component, the tool interface comprising a plurality of recesses corresponding to the plurality of spaced detents;
a plurality of engagement members wherein each of the plurality of engagement members comprises a ball wherein the plurality of engagement members are configured to reside, in part, in the plurality of detents and, in part, in the plurality of recesses; and
a plurality of compression members wherein each of the plurality of compression members comprises a spring in the plurality of recesses, wherein each of the plurality of compression members provides a compressive force on each of the plurality of engagement members such that rotation of the tool interface causes the threaded component to rotate until a rotational torque applied to the tool interface exceeds a predefined torque-limit.

15. The torque-limiting nut of claim 14 wherein the plurality of recesses comprise a plurality of holes.

16. The torque-limiting nut of claim 14 wherein each of the plurality of springs comprise a first end that engages a ball and a second end, opposite the first end, that engages a retaining ring.

17. A torque-limiting nut comprising:
a threaded component, the threaded component comprising:
a cylindrical main body having a threaded bore, an outer surface, a plurality of detents in the outer surface; and
an annular flanged portion radially extending from an end of the cylindrical main body,
a tool interface, separate from the threaded component, having an internal bore sized to receive the cylindrical main body of the threaded component, the tool interface comprising:
a plurality of recesses formed in the internal bore corresponding to the plurality of detents;
a spring groove open to the recesses and the internal bore; and
an elastic member in the spring groove, wherein the elastic member is a garter spring;
a plurality of engagement members wherein the plurality of engagement members are configured to reside, in part, in the plurality of detents and, in part, in the plurality of recesses, and
wherein the elastic member provides a compressive force on the plurality of engagement members such that rotation of the tool interface causes the threaded component to rotate until a rotational torque applied to the tool interface exceeds a predefined torque-limit.

* * * * *